United States Patent
Talapov et al.

(10) Patent No.: US 7,412,104 B2
(45) Date of Patent: Aug. 12, 2008

(54) OPTIMIZED LOSSLESS DATA COMPRESSION METHODS

(76) Inventors: Andrei Talapov, 19735 Crystal Rock Dr. 21, Germantown, MD (US) 20874-4717; Daniel Kilbank, 8186 Inverness Ridge Rd., Potomac, MD (US) 20854; John Quagliano, 7505 Democracy Blvd., #331, Bethesda, MD (US) 20817; Thomas Lyon Gideon, 14017 Drake Dr., Rockville, MD (US) 20853; Ted Malaska, 19915 Tygart La., Gaithersburg, MD (US) 20879; Janek Claus, 9712 Nassau La., Silver Spring, MD (US) 20901; Hadon Nash, 158 Kittoe Dr., #3, Mountain View, CA (US) 94043-3915

( * ) Notice: Subject to any disclaimer, the term of this patent is extended or adjusted under 35 U.S.C. 154(b) by 253 days.

(21) Appl. No.: 11/343,908

(22) Filed: Jan. 30, 2006

(65) Prior Publication Data

US 2007/0053601 A1 Mar. 8, 2007

(51) Int. Cl.
G06K 9/36 (2006.01)
(52) U.S. Cl. .................. 382/244; 382/232; 382/233; 382/248
(58) Field of Classification Search .......... 382/244, 382/232, 233, 248; 345/440; 375/240.18
See application file for complete search history.

(56) References Cited

U.S. PATENT DOCUMENTS

| | | | | |
|---|---|---|---|---|
| 5,825,369 A | * | 10/1998 | Rossignac et al. | 345/440 |
| 6,222,884 B1 | * | 4/2001 | Mitchell et al. | 375/240.18 |
| 2003/0028387 A1 | | 2/2003 | Kilbank et al. | 704/500 |
| 2003/0093451 A1 | | 5/2003 | Chuang et al. | 708/203 |
| 2004/0207548 A1 | | 10/2004 | Kilbank et al. | 341/107 |
| 2004/0208240 A1 | | 10/2004 | Kilbank et al. | 375/295 |
| 2004/0208315 A1 | | 10/2004 | Kilbank et al. | 707/6 |

* cited by examiner

Primary Examiner—Anh Hong Do
(74) Attorney, Agent, or Firm—Gottlieb Rackman & Reisman, PC

(57) ABSTRACT

A method for losslessly encoding and compressing and decoding original, raw, raster data, and other files by optimizing the results of preprocessing and transformation techniques. Four stages are involved: pre-processing during which the data is replaced by predictive values and the deviations from the predictive value; mapping each block through a transform sequence using a lossy reversible mapping; minimizing the joint entropy of the transformed data and deviation data by varying parameters for the predictive and transform step; and encoding the transformed sequence. At each stage of the compression of the data, different techniques are tried and compared and an optimal technique used to carry out that state.

2 Claims, 4 Drawing Sheets

OPTIMIZED LOSSLESS DATA COMPRESSION METHODS

FIELD OF THE INVENTION

The present invention relates to methods and apparatus for lossless data compression and the lossless transmission of data, and, more particularly to methods for optimizing lossless data compression by preprocessing the data and selecting optimal transformations algorithms.

BACKGROUND OF THE INVENTION

Data compression is an essential component of many applications and therefore much attention has been given to the problem of improving data compression. The internet requires data compression to put images, audio and video on websites in a practical embodiment. Digital TV, satellite TV and the recording of movies on DVD likewise require compression. The JPEG and MPEG image standards use lossy data compression to provide represent an image or video. Recently announced programs by Google to scan the entire research libraries of Harvard, Stanford and the New York Public Library show a trend for huge image and text databases that will require compression if they are to maintained on reasonable amounts of physical storage media or to be efficiently accessed. Transmission of image files between computers using email attachments or between cell phones also benefits from compression of the files. Such programs as ZIP provide lossless compression for the individual user.

Compression system may be divided into lossy and lossless systems, the lossless systems being those where the original file can be exactly reconstructed when compression is reversed. The most common methods of compression are Huffman coding, Arithmetic coding, PPM (Prediction with Partial Match), Markov coding, RLE (Run Length Encoding), and Multi-media compressions such as JPEG/MPEG. In this context coding includes the assignment of binary sequences to elements being encoded.

Huffman coding is a lossless entropy encoding algorithm that finds the optimal system of encoding strings based on the relative frequency of each character. Huffman coding uses a specific method for choosing the representations for each symbol, resulting in a prefix-free code (that is, no bit string of any symbol is a prefix of the bit string of any other symbol) that expresses the most common characters in the shortest way possible. It has been proven that when the actual symbol frequencies agree with those used to create the code, Huffman coding is the most effective compression method of this type: no other mapping of source symbols to strings of bits will produce a smaller output.

Arithmetic encoding avoids a problem with Huffman coding, namely the need for codewords for all possible sequences of a given length in order to encode a particular sequence of that length. Arithmetic encoding assigns a unique tag to each distinct sequence of symbols by using the cumulative distribution function to map the sequence of symbols into values in the unit interval.

PPM is a context-based algorithm which uses the context of a symbol to estimate the probability of its value. The probability is estimated as the coding proceeds as opposed to estimating and storing a large number of conditional probabilities in advance of coding. One parameter in a PPM encoding scheme is the maximum length for a context. Another parameter is the count assigned to the escape symbol that indicates that a symbol to be encoded has not previously been encountered with a context.

Markov encoding relies upon the last few samples of a process to predict the probability of the next symbol and is a form of predictive encoding. One parameter in such encoding is the number of samples that are considered sufficient for purposes of the prediction.

RLE encoding codes the lengths of runs of a particular pixel rather than coding individual values.

MPEG and JPEG achieve high compression rates of video images by storing only the changes from one frame to another, instead of each entire frame. The video information is then encoded using a technique called DCT (Discrete Cosine Transformation). MPEG/JPEG uses a type of lossy compression, since some data is removed. But the diminishment of data is generally imperceptible to the human eye. The lossy data is then encoded in a Huffman encoding scheme. The result is lossy compression.

Lossy systems make determined sacrifices of data which are deemed not essential. A lossy system for audio transmission of music may, for example, dispense with data that records frequencies of sound beyond the ability of the intended reproduction medium. A lossy system for video transmission of images may, for example dispense with data that records color differences too subtle for an intended reproduction medium. Lossless systems are generally more desirable because they enable complete reproduction of the original without the losses that some programmer assumed would be tolerable; lossy systems are in effect merely a compromise to permit effective compression.

There are criterion that should be met in order for any of these compressions to work efficiently. Typically, there needs to be succession runs of similar information data elements or elements that have been mapped to a different code source. Lossy compression techniques truncate information by using association, quantization, or simply by only encoding information in a set boundary. In most cases this may be acceptable because the data is not imperative to the application or source and can therefore be cut out. Each of the compression methods discussed makes assumptions about the data to be encoded and has parametric values that may be adjusted to specify a specific implementation of the encoding algorithm more suitable to particular data.

In general it is known to evaluate the efficiency of a compression scheme by comparing the bit length required to encode data with the entropy of the data in the particular scheme. If $\{X1, X2, \ldots, Xn\}$ is a sequence of length n from a source having m different characters, let $$Gn = -\text{Sum } P(X1, X2, \ldots, Xn) \log P(X1, X2, \ldots, Xn)$$

where $P(X1, X2, \ldots, Xn)$ represents the probability of finding in the data particular values for $X1$, $X2$, etc. and the sum is over all possible particular values. Then the entropy H is defined as $$H = \lim(1/n) Gn,$$

where the limit is as n approaches infinity.

For independently identically distributed elements in the sequence this is the same as $$H = -\text{Sum } P(X1) \log P(X1).$$

It would be desirable to attempt different transformations of particular data on the fly by adjusting the parameters that define a particular encoding scheme or transformation and selecting the one that is optimal. Lossy compression transformations may be characterized by arbitrary parameters, which are usually chosen to achieve desired compression ratios. Arbitrary small changes of these parameters are permitted by lossy compression algorithms. Thus lossy encoding schemes allow continuous variation of their defining parameters, with continuously varying results in efficiency. However such flexibility does not exist for known lossless encoding schemes, which do not produce comparable slowly varying coding efficiencies when their defining parameters are slowly varied. The requirement of compression to be lossless usually leads to very strict limitations, which do not permit one to use continuously adjustable parameters. For example, the LZW algorithm does not permit any continuously variable parameters.

What is desired are methods for lossless data compression which allows the adjustment of parameters during encoding and thus the optimization of compression. In particular such a method is desired for the encoding on a device having a digital processor of raster images and their subsequent decoding.

What is also needed are methods for combining lossy and lossless data compression into overall lossless methods that have continuously variable parameters that permit the improvement or optimization of the compression process based upon trials with the particular data being compressed.

BRIEF DESCRIPTION OF THE INVENTION

The present invention employs lossy transformation, which is defined as a function of a limited set of parameters, to provide optimal lossless compression. The procedure consists of the following steps:

1) The initial set of data $y_{init}$ is compressed by a parametrized lossy transformation into a set of data $y_{trans}$.

2) A reverse transformation is used to get a lossy version of the initial data, $y_{lossy}$.

3) The difference between the initial data and the reverse transformed lossy version of the data is calculated, $y_{difference} = y_{initial} - y_{lossy}$. Differences are preferred. However, in lieu of the differences, another function allowing reconstruction of the initial data from the lossy data may be used.

4) The complete set of compressed data is treated as composed of entropy encoded data $y_{trans}$ and $y_{difference}$. The compression ratio is defined by the sum of the entropies of $y_{trans}$ and $y_{difference}$. Due to the initial parametrized lossy transformation, this value of the compression ratio is a function of a limited set of parameters. Entropy is the preferred function. However, in lieu of entropy other measures of the efficiency of the data may be used.

5) The sum of entropies is minimized by adjusting the transformation parameters. In lieu of entropies other measures of the efficiency of the data compression may be used.

6) The values of the parameters that maximize compression are then used to perform an actual final compression. Where maximization is not required a lesser optimization may be acceptable. In this sense optimization may refer to a significant improvement rather than a unique value.

7) Decompression is achieved by using these same values of the parameters and reversing the compression transformation.

Although the entropy of $y_{trans}$ may be made arbitrarily small, the sum of the entropies cannot be made arbitrarily small, and has a minimum only at certain values of the transformation parameters. There is an important difference between the lossless parametrized compression of the present invention and the usual lossy parametrized compression, where the compression ratio is defined subjectively. In particular the parametric values used in the final compression are in general not those that would be suggested by minimizing the lossy compression taken in isolation. The present invention provides greater freedom of choice of compression procedure than usual non-parametrized lossless methods, and leads to better compression.

The preferred embodiment of the invention uses for its parametrized lossy transformation a procedure comprising prediction and KL (Karhunen-Loeve) transformation. Although the preferred embodiment is for use with still images, the invention is not limited to images, but can be applied to any kind of data capable of representation in a digital medium, especially multimedia data.

The present invention is, in a preferred embodiment, a method for losslessly encoding and compressing and decoding original, raw, raster data, such as found in digital intermediate files for movie production and high-resolution medical and satellite images. It is a lossless procedure employing transform coding in which a source output is decomposed, or transformed, into components that are then coded according to their individual characteristics.

Four stages are involved in the transform coding of the data. The first is a pre-processing stage in which the data is compressed by a parameterized lossy transformation into a transformed data set. The data is then reversed by a reverse transformation and a lossy version of the initital data is obtained. The difference between the initial data and the transformed data is calculated. In a preferred embodiment, during the pre-processing state the data is divided into blocks and replaced by predictive values and the deviations of the original data from the predictive value. Both the division into blocks and the method for calculating the predictive value are subject to adjustable parameters. Examples are the block dimensions and the method of prediction. The second stage is the mapping of each block into a transform sequence using a reversible mapping. This transformation uses autocorrelation functions. In a third stage the efficiency of the transformed sequence is determined by calculating its entropy. The optimal set of parameters for minimizing the entropy is determined and applied to the data. In a fourth stage the dual data, i.e. the transformed lossy and difference data is encoded by a binary encoding technique.

Preprocessing of Raster Image Data

During preprocessing the data in each cell may be compared to a predicted value determined as a function of the data in a subset of cells. Examples of such functions are averaging the values of a cell's nearest neighbors or its second nearest neighbors either with or without weighting the distance to a particular cell. The type of averaging or functional transformation to form predicted values is chosen to reduce the variation of the preprocessed data. The entropy of the data formed by different averaging techniques may be calculated and the method of averaging that produces the least entropy utilized.

The (pre-processed) data in each subarray is compared with other subarrays to determine correlations and a Karhunen-Loeve transformation (KLT) is performed.

At each stage of the compression of the data, different parameters are tried and compared and an optimal technique minimizing the sum of the entropies of the transformed and difference data is calculated.

In some instances the array of predicted values permits greater compression than the original data and in others it does not. In general, where the distribution of values is not reduced by the prediction process, the original data is utilized in place of the predicted data.

An averaging technique is used to make the prediction by taking the brightness differences, comparing them to the mean of selected neighboring values and creating a brightness prediction. When the image pixels have multiple data for different colors, the data in different color planes are compared as well. A prediction model is chosen based upon the brightness difference from the mean brightness value.

The distribution of the data values is compared to the distribution of values of the prediction. Only if the predicted image has a smaller distribution than the original data is it utilized by returning the predicted image. Otherwise, the intensity data difference array is formed from the original data in place of the prediction values. The process is repeated for each of the planes of data. The different planes of the same pixel are not used entirely independently.

The matrix of values is broken into small blocks and a check is made to determine whether the KL transform is beneficial in reducing the amount of data being compressed. If it is, the KLT matrix is calculated.

The KLT matrix, which comprises the eigenvectors of the autocorrelation matrix, may be further reduced by replacing by zeros the eigenvector corresponding to the smallest eigenvalue of the KLT matrix. This process is repeated by reducing the KLT matrix by removing the eigenvectors corresponding to successively larger eigenvalues. This is an example of a parametric adjustment of a lossy transformation. At each stage the result of the use of such a modified KLT matrix is compared by calculating the entropy of the resulting data plus the entropy of the difference values, and the best modified KLT matrix is employed in the transformation.

If the KLT transform produces no benefit, it is not utilized and this fact is recorded in the data, simplifying the reversal procedure. When the optimal number is achieved of reduction to zero of low eigenvalued eigenvectors the so-reduced KLT matrix and any meta data is prepared for transmission. The data is then arithmetically encoded and a file written in memory for the particular subimage.

Thus at each stage of the procedure testing occurs as which of several algorithms for preprocessing occurs and the selection of an optimally simplified KLT matrix.

A preferred embodiment is termed the Z-algorithm.

DETAILED DESCRIPTION OF A PREFERRED EMBODIMENT

Figure 1:
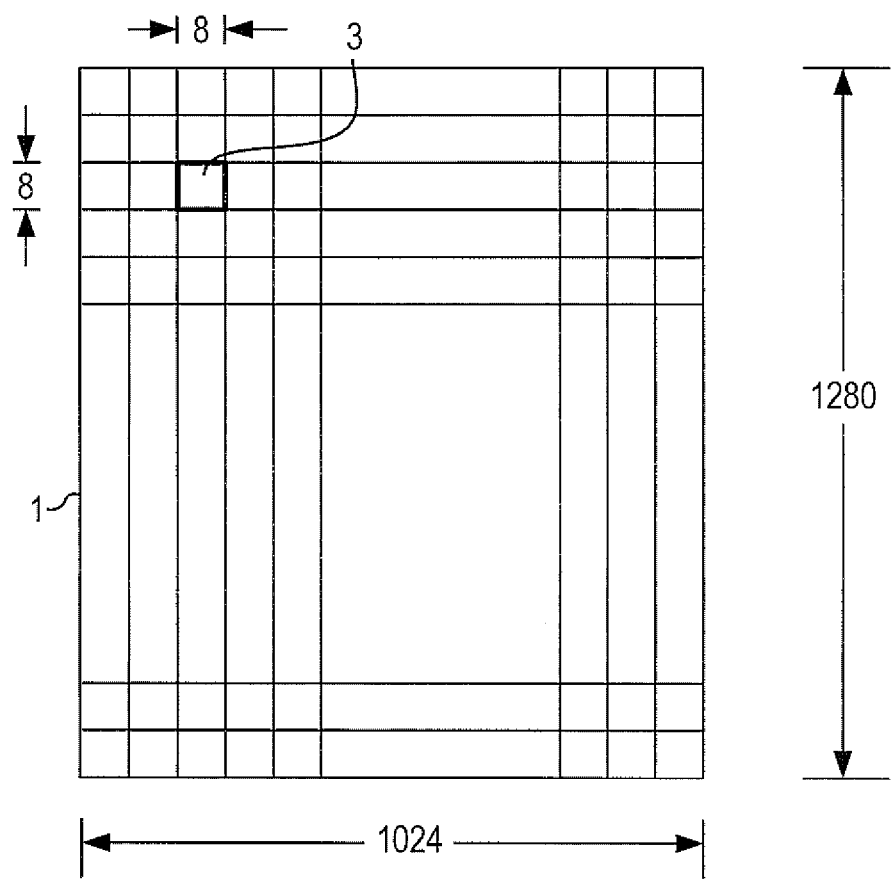
FIG. 1 depicts an array of pixels forming a portion of the data requiring compression.

The Z algorithm for data compression is designed for the compression of raster graphics images although the invention is suitable for other data types. A raster graphics image, digital image, or bitmap, is a data file or structure representing a generally rectangular grid of pixels, or points of color, on a computer monitor, paper, or other display device. The color of each pixel is individually defined; images in the RGB color space, for instance, often consist of colored pixels defined by three planes of bytes-one byte each for red, green and blue. Less colorful images require less information per pixel; an image with only grey scale pixels only requires a single byte for each pixel, and thus a single plane; an image with only black and white requires on a single bit for each pixel. Raster graphics are distinguished from vector graphics in that vector graphics represent an image through the use of geometric objects such as curves and polygons.

A bitmap corresponds bit for bit with an image displayed on a screen, probably in the same format as it would be stored in the display's video memory or maybe as a device independent bitmap. A bitmap is characterized by the width and height of the image in pixels and the number of bits per pixel, which determines the number of colors it can represent.

A colored raster image (a "pixmap") will usually have pixels with between one and eight bits for each of the red, green, and blue components, though other color encodings are also used, such as four- or eight-bit indexed representations that use vector quantization on the (®, G, B) vectors. The green component sometimes has more bits that the other two to cater for the human eye's greater discrimination in this component.

The quality of a raster image is determined by the total number of pixels (resolution), and the amount of information in each pixel (often called color depth). For example, an image that stores 24 bits of color information per pixel (the standard for most high-quality displays in 2004) can represent smoother degrees of shading than one that only stores 15 bits per pixel, but not as smooth as one that stores 48 bits. Likewise, an image sampled at 640×480 pixels (therefore containing 307,200 pixels) will look rough and blocky compared to one sampled at 1280×1024 (1,310,720 pixels). Because it takes a large amount of data to store a high-quality image, data compression techniques are often used to reduce this size for images stored on disk. Some techniques sacrifice information, and therefore image quality, in order to achieve a smaller file size. Compression techniques that lose information are referred to as "lossy" compression.

Data compression relies on structure that exists within the data. For example, in the case of data representing graphic images, the data in many regions does not change abruptly until one reaches an edge of an image component. This inherent structure implies that it may be more economical to describe the changes in data than the data themselves. Since the changes are likely to be small and smoothly varying they may be approximated by linear functions, just as any smoothly varying function may in small regions be approximated by a value and a first derivative.

The Z algorithm employs transform coding in which a source output is decomposed, or transformed, into components that are then coded according to their individual characteristics.

Four stages are involved in the transform coding of the data. The first is a pre-processing stage during which the data is divided into blocks and replaced by predictive values and the deviations from the predictive value. The predictive value is determined by the function have as its arguments a subset of cells determined from the particular location in the data array of the particular cell. In the second stage each block is mapped into a transform sequence using a reversible mapping. This transformation uses autocorrelation functions to exploit the symmetries inherent in the predictive data. In a third stage the efficiency of the transformed sequence is determined by calculating its entropy. The optimal set of parameters for minimizing the entropy is determined and applied to the data. In a fourth stage the dual data, i.e. the transformed lossy and difference data is encoded by a binary encoding technique.

Preprocessing of Raster Image Data

Figure 2:
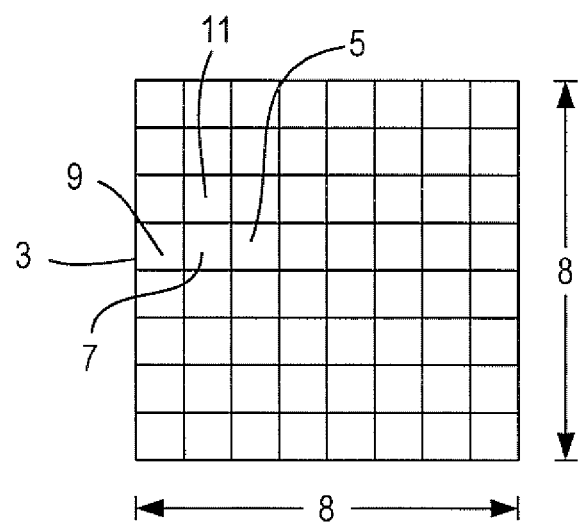
FIG. 2 depicts a sub-array of the data depicted in FIG. 1.

As shown in FIG. 1, for one set of parameters a portion of an image is composed of a rectangular array 1 of 1024×1280 pixels, which is further divided into 128×160 rectangular subarrays, each composed of 8×8 pixels. Where the image has fewer pixels than 1024×1280, it is padded with zeros to fill that area. These do not affect the autocorrelation. A typical subarray is labeled 3 in FIG. 1, and is shown enlarged in FIG. 2. In the case of grayscale images, each cell 5 of subarray 3 comprises a single pixel element represented by a single byte of data. For a color image there would be three arrays 1, corresponding to the red, green and blue components of the color image.

The data in each cell such as 5, may be compared to a predicted value determined by averaging the values of its nearest neighbors or its second nearest neighbors. A nearest neighbor of a cell is any other cell abutting on it. Thus cell 7 is a nearest neighbor of cell 5, and cell 9 is a second nearest neighbor of cell 5. The determination of the predicted value of cell 5 may be determined by different weighted averages of its nearest neighbors and second nearest neighbors. For example cells in the corner of cell 5, such as cell 11 may be given less weight than cells like 7 that abut flush against cell 5. For cells at the edges of the subarray the nearest neighbors may lie in an adjoining subarray and thus the predicted values are based on the location of neighbors within the array 1.

The calculation of predicted values in one embodiment of the invention commences in the upper left corner of the array. One value of the array, say that in the upper left corner and the array of differences is sufficient to recover the value of all the array elements by adding the difference elements pixel by pixel spreading outwards from the corner.

For many images the difference values are less varied than the initial data. Thus looking for patterns among the difference values will be more successful than if there were no preprocessing of the raster image data. Indeed the type of averaging to form predicted values may be chosen to reduce the variation of the preprocessed data. The entropy of the data formed by different averaging techniques may be calculated and the method of averaging that produces the least entropy utilized. From here onwards the process will deal with the preprocessed data.

Autocorrelation—Transformation of the Data

The next stage is to compare the (pre-processed) data in each subarray with the other subarrays and determine correlations. This is done by treating the data in each subarray as the components of a vector in a 64 (=8×8) dimension linear vector space. Each subarray's data may thus be thought of a point in that space represented by the end of a vector from the origin. A particular data point has values represented by its components on a basis set of axes. Autocorrelation then corresponds to identifying the linear direction in this space which is the best approximation to the line along which the data points lie. The data points may then be replaced by points along this line which are closest to the data points. This second reduction of the data then is reduced to data defining for each subarray a direction in a 64 dimension linear vector space and a distance along the line pointing in that direction. In general it takes 63 numbers to represent a direction in a 64 dimension space. Thus the amount of data required is 128× 160+63+1=20,544 values to represent 1280×1024=1,310,720 data values, a reduction of 63.8 times.

From basic principles of linear algebra, the transformation of the data is represented by a 64×64 dimensional orthogonal matrix which rotates the line along which the data lies onto an axis of the space. Decompression of the data will then require rotation of the data lying along an axis back to its proper position, which is accomplished by operating on the data vector with the inverse of the transformation matrix.

The preferred transformation is the Karhunen-Loeve transformation (KLT). The rows of the transformation matrix for the KLT are the eigenvectors of the autocorrelation matrix of the data. That autocorrelation matrix is defined as a matrix whose (i,j)th element is given by:

$$E[X_n X_{n+|i-j|}]$$

where E[XnXm] is the expected value of the product among the data.

Figure 3:
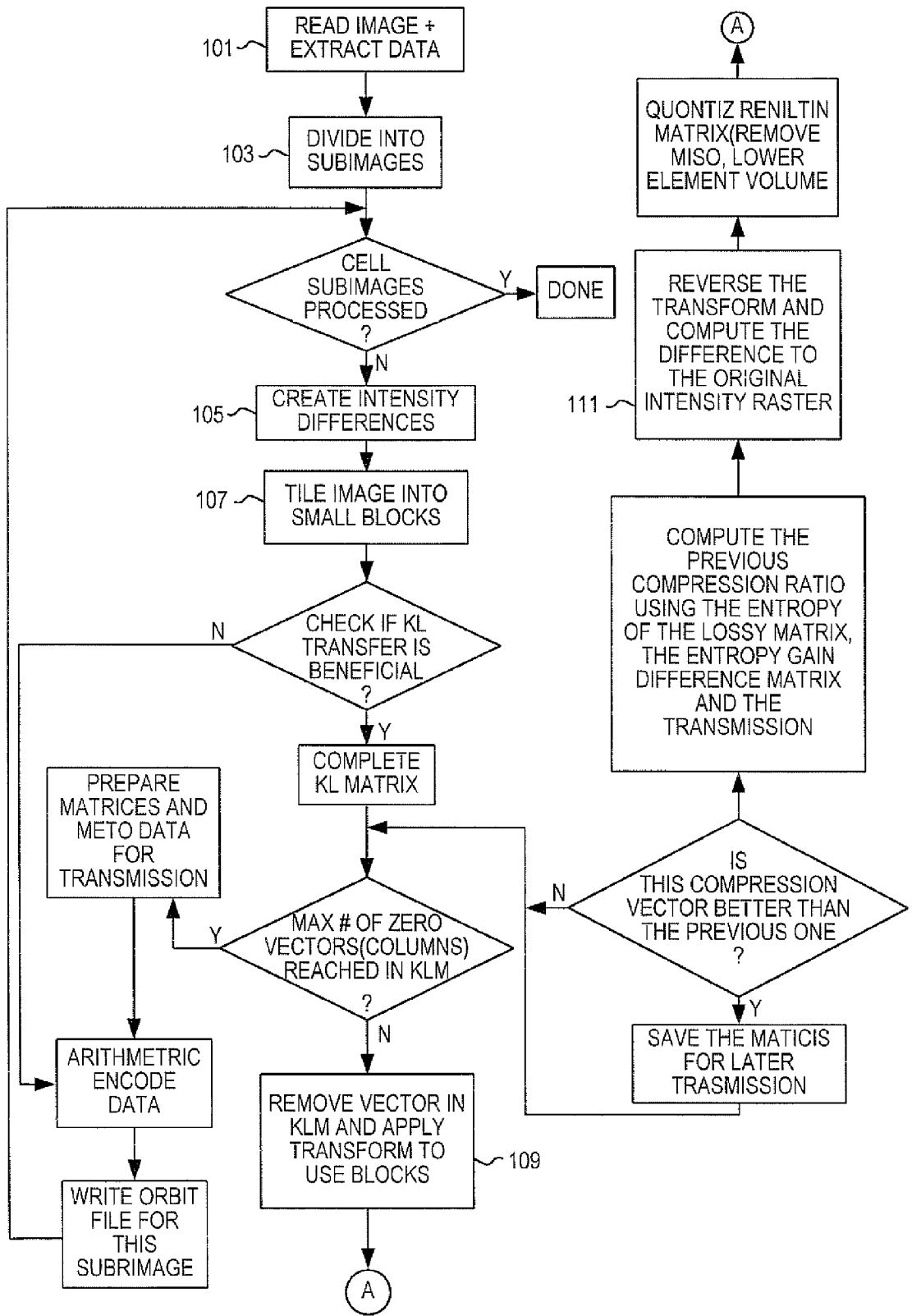
FIG. 3 is a flow chart of one preferred embodiment of the Z-algorithm for raster image data.

At each stage of the compression of the data, different techniques are tried and compared and an optimal technique determined from the sum of entropies used to carry out that state. The process is shown in detail in FIG. 3

Figure 4:
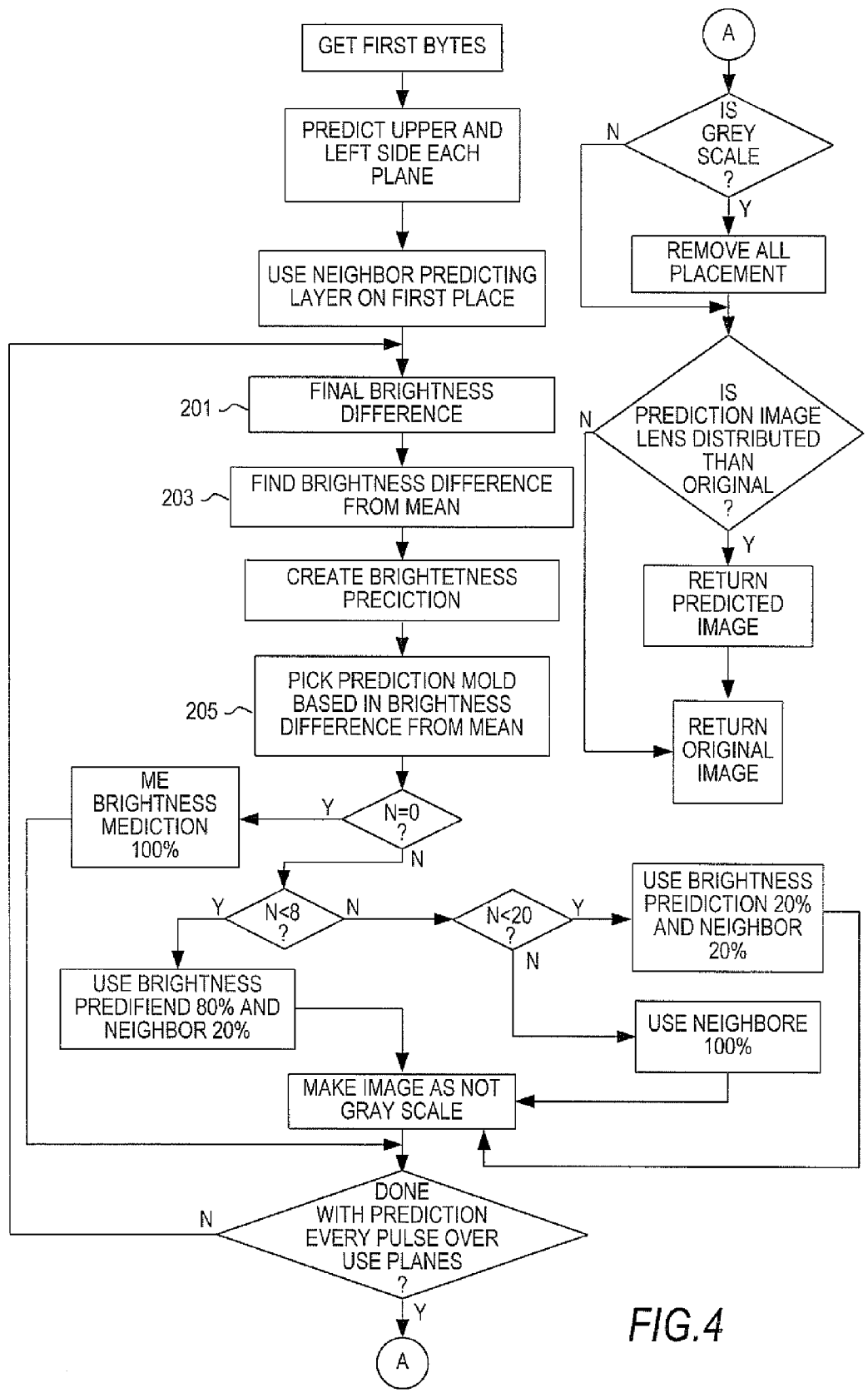
FIG. 4 is a flow chart of the procedure for creating intensity differences for use in one preferred embodiment of the Z-algorithm.

As shown in that figure, an image to be compressed is read 101 and raster data is extracted. The data is then divided 103 into subimages. Each subimage is then processed independently of the other subimages. First an array of intensity differences 105 is created. FIG. 4 is a flow chart of the steps in a preferred embodiment of the method for creating the matrix of intensity differences. As described in FIG. 4, the bytes are dealt with on each plane in the case of color images. The prediction of values commences in the upper and left side of each plane.

It has been found that in some instances the array of predicted values permits greater compression than the original data and in others it does not. In general, where the distribution of values is not reduced by the prediction process, the original data is utilized in place of the predicted data.

An averaging technique is used to make the prediction by taking the brightness differences 201 comparing them to the mean of selected neighboring values 203 and creating a brightness prediction. A prediction model is chosen 205 based upon the brightness difference from the mean brightness value. If the difference is zero, the predicted value is used. If the difference is less than 8, a weighted value is used by weighting the brightness prediction and a neighboring value in the ration 80:20. If the difference is greater than or equal to 8 and less than 20, the image is marked as not being a gray scale image and a weighted value is used by weighting the brightness prediction and a neighboring value in the ration 20:80.

If the image is a gray scale image only one plane is considered. The distribution of the data values is compared to the distribution of values of the prediction. Only if the predicted image has a smaller distribution than the original data is it utilized by returning the predicted image. Otherwise, the intensity data difference array is formed from the original data in place of the prediction values. The process is repeated for each of the planes of data.

Since the compression of data is more efficient where the data varies slowly, the different planes of the same pixel are not used entirely independently.

Returning to FIG. 3, the matrix of values is broken into small blocks 107 and a check is made to determine whether the KL transform is beneficial in reducing the amount of data being compressed. If it is, the KLT matrix is calculated.

The KLT matrix, which comprises the eigenvectors of the autocorrelation matrix, is further reduced by replacing by zeros the eigenvector corresponding to the smallest eigenvalue of the KLT matrix. This process is repeated by reducing the KLT matrix by removing the eigenvectors corresponding to successively larger eigenvalues. At each stage the result of the use of such a modified KLT matrix is compared by calculating the entropy of the resulting data.

In particular, as the successive eigenvectors are removed from the KLT matrix, the transform is applied 109 to the data blocks and the resulting matrix is quantized. At this point, the transform is reversed and the difference from the original intensity raster is computed 111. The entropy of the difference matrix is compared to that of the previously transformed and now recovered data and the KLT matrix is retained for later use.

If the KLT transform produces no benefit, it is not utilized and this fact is recorded in the data, simplifying the reversal procedure. When the optimal number is achieved of reduction to zero of low eigenvalued eigenvectors the so-reduced KLT matrix and any meta data is prepared for transmission. The data is then arithmetically encoded and a file written for the particular subimage.

Thus at each stage of the procedure testing occurs as which of several algorithms for preprocessing occurs and the selection of an optimally simplified KLT matrix.

The difference vector is reshaped into a matrix of dimension 64 by the largest integer less than vector length. A small amount of data that remains after shaping into these matrices is sent without compression.

The autocorrelation matrix is calculated and its eigenvalues and eigenvectors are calculated. From this the KLT matrix is formed. The least significant eigenvector (i.e. that which has the smallest eigenvalue) is replaced by zeros. This is iterated and the compressed value calculated until the loop produces the maximal compression as determined by the entropy of the data.

The transformed data is quantized by rounding/normalizing both the resultant data matrix and the eigenvector set that produces it. The level of precision can vary but is $2^{\wedge}10$ for the eigenvectors. The entropy is calculated in the normal Shannon way after some rebinning of data.

Figure 5:
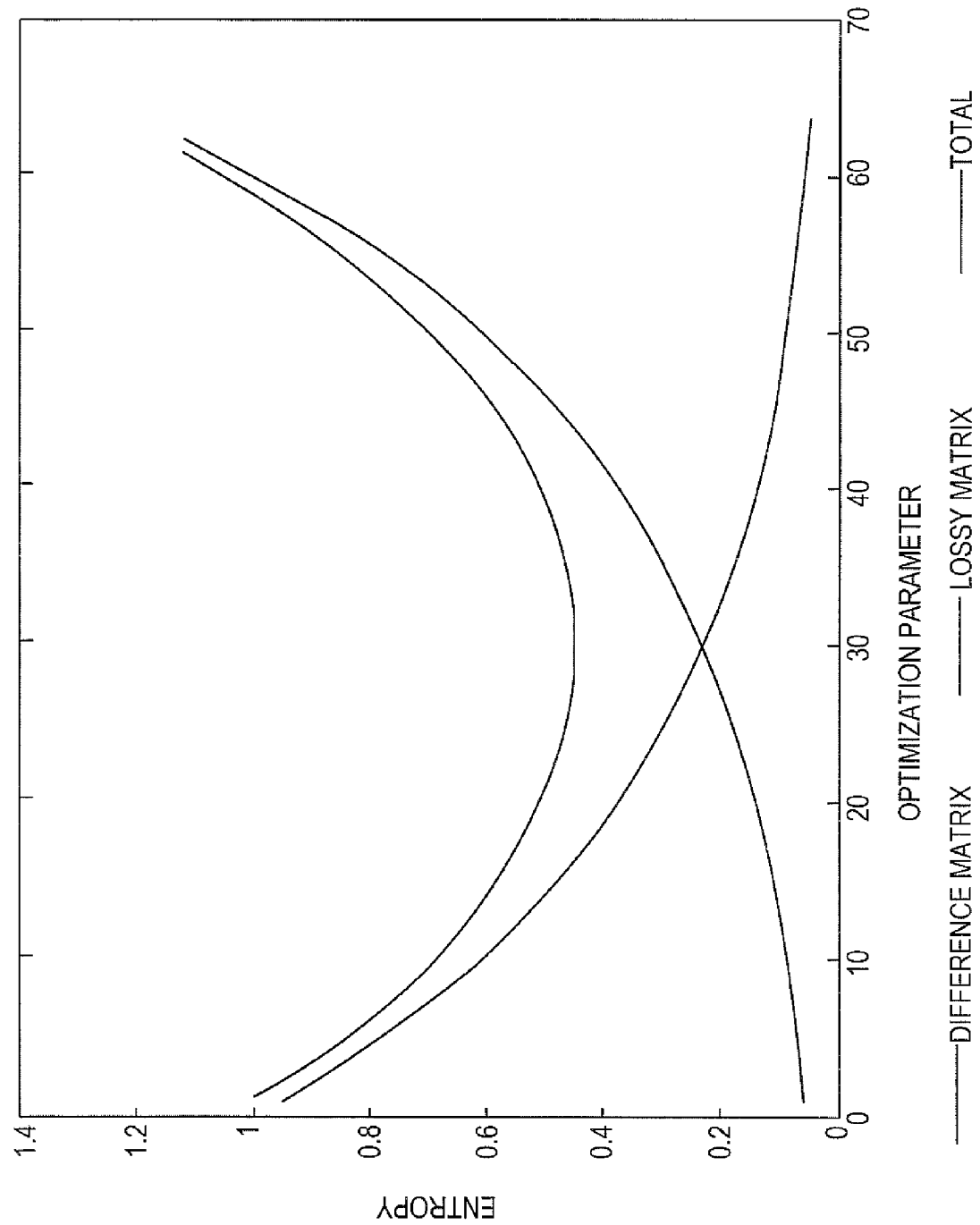
FIG. 5 is a graph of a qualitative example of tradeoffs in parameter optimization.

FIG. 5 shows a qualitative example of tradeoffs in parameter optimization. The lower left curve depicts the entropy of the lossy transformation as a function of an optimization parameter. The lower right curve depicts the entropy of the difference data as a function of the same optimization parameter. The upper curve is the total which may be seen to have a minimum at a value of the optimization parameter that is not the minimum for either the lossy or difference data.

While the invention has been described in terms of preferred embodiments, those skilled in the art will recognize that the invention can be practiced with modifications within the spirit and scope of the appended claims. In particular, although the invention describes lossless encoding, use of the invention accompanied by variation to accept some loss would still be within the scope of the invention.

What is claimed is:

1. A method for lossless compression of data by a digital processor employing a lossy transformation defined as a function of parameters, comprising compressing an initial set of data $y_{init}$ by a parametrized lossy transformation into a set of data $y_{trans}$, reversing the transformation to provide a lossy version of the initial data, $y_{lossy}$, determining a difference between the initial data and the reverse transformed lossy version of the data by calculating, $y_{difference} = y_{initial} - y_{lossy}$.

minimizing the sum of entropies of $y_{difference}$ and $y_{trans}$ as a function of the transformation parameters to determine a value of the parameters for optimal compression, using the values of the parameters that maximize compression to perform a compression.

2. The method of claim 1 further comprising decompressing the data by reversing the compression transformation.

* * * * *